US009009713B2

(12) United States Patent
Lee et al.

(10) Patent No.: US 9,009,713 B2
(45) Date of Patent: Apr. 14, 2015

(54) APPARATUS AND METHOD FOR PROCESSING TASK

(71) Applicant: Electronics and Telecommunications Research Institute, Daejeon (KR)

(72) Inventors: Soo Jeon Lee, Daejeon (KR); Won Chan Jung, Daejeon (KR); Jae Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 94 days.

(21) Appl. No.: 13/793,108

(22) Filed: Mar. 11, 2013

(65) Prior Publication Data

US 2014/0101669 A1    Apr. 10, 2014

(30) Foreign Application Priority Data

Oct. 5, 2012 (KR) .................. 10-2012-0110755

(51) Int. Cl.
*G06F 9/46* (2006.01)
*G06F 9/54* (2006.01)
*G06F 9/50* (2006.01)

(52) U.S. Cl.
CPC ............... *G06F 9/54* (2013.01); *G06F 9/5038* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 5,258,915 A * | 11/1993 | Billington et al. ............ 700/103 |
| 6,928,646 B1 * | 8/2005 | James et al. .................. 718/104 |
| 2006/0107267 A1 * | 5/2006 | Miyachi et al. ............... 718/100 |
| 2008/0027920 A1 * | 1/2008 | Schipunov et al. ............... 707/4 |
| 2008/0086480 A1 * | 4/2008 | Srivastava et al. .............. 707/10 |
| 2009/0089139 A1 * | 4/2009 | Rojas-Cessa et al. ............ 705/9 |
| 2009/0249029 A1 * | 10/2009 | Liu et al. ......................... 712/28 |
| 2011/0158089 A1 | 6/2011 | Sambhwani et al. |
| 2011/0251878 A1 | 10/2011 | Subramanian et al. |

FOREIGN PATENT DOCUMENTS

KR        100478346 B1    3/2005

* cited by examiner

*Primary Examiner* — Emerson Puente
*Assistant Examiner* — Sisley Kim
(74) *Attorney, Agent, or Firm* — Ladas & Parry LLP (57) ABSTRACT

Provided is a task processing apparatus and method that may select a task corresponding to predetermined task selection information when a task execution is completed and thus, an idle server occurs in at least one server, may separate the selected task into a first task and a second task, and may control the first task and the second task to be allocated to an existing allocation server of the selected task and an idle server, respectively.

10 Claims, 8 Drawing Sheets

1) TASK HAVING RELATIVELY LARGE NUMBER OF CHILD NODES
2) TASK HAVING RELATIVELY SMALL PREDICTION INTERVAL UP TO CHILD NODE
3) MINIMIZE AVERAGE EXECUTION TIME OF ENTIRE NODES
4) MINIMIZE EXECUTION TIME OF NODE HAVING LONGEST EXECUTION TIME ON PRECEDENCE GRAPH
5) OTHERS

APPARATUS AND METHOD FOR PROCESSING TASK

CROSS-REFERENCE TO RELATED APPLICATION

This application claims the priority benefit of Korean Patent Application No. 10-2012-0110755, filed on Oct. 5, 2012, in the Korean Intellectual Property Office, the disclosure of which is incorporated herein by reference.

BACKGROUND

1. Field of the Invention

Embodiments of the present invention relate to an apparatus and method for processing a large amount of data.

2. Description of the Related Art

To process a large amount of data, for example, weather satellite image data, a distributed/parallel processing technology that configures a cluster using a plurality of servers, and enables the plurality of servers to simultaneously perform an operation is required. In addition, to provide a method of processing a large amount of data, a task may need to be efficiently distributed to each server and be processed by configuring a distributor in the case of using a server on a cluster.

In general, a client may request the distributor to execute a predetermined task. The task may wait in a waiting queue of the distributor for load balancing and may be allocated to a predetermined server and be executed based on a predetermined order. When an already waiting task is present in the waiting queue and an idle server is present, the waiting task may be allocated to the idle server and be executed.

Even though a super computer may be generally used to process a large amount of data, current development in the distributed/parallel processing technology has achieved a processing rate more than a processing rate of the super computer by configuring and simultaneously driving PC clusters. For example, Google is processing search queries using millions or more of Linux-based PCs. Even a large cloud service provider such as Amazon Corporation is providing a computing service by configuring a large cluster.

In a transaction environment, such as a bank, that requires frequent updating, deleting, and inserting data, a database management system may be required.

In the case of infrequently and collectively processing large bulk data, for example, in the case of constructing a database of a large search engine, a new paradigm is required. Google Corporation is using a MapReduce framework. Hadoop is a new framework that has been developed in an open source by copying the MapRduce framework of Google Corporation. Hadoop is used for various applications since it makes a MapReduce operation easy, for example, makes it easy to generate an inverted index table of webpages. However, the above schemes may be applicable only in a case in which precedence between tasks is not considered and thus, may inefficiently operate.

SUMMARY

According to an aspect of the present invention, there is provided a task processing apparatus, including: an allocator to allocate at least one task to at least one server; an executor to execute each task through each server; a task selector to select a task corresponding to predetermined task selection information when a task execution is completed and an idle server occurs in the at least one server; a separator to separate the selected task into a first task and a second task; and a controller to control the first task and the second task to be allocated to an existing allocation server of the selected task and the idle server, respectively.

The controller may increase a parallelization level of the first task and the second task compared to a parallelization level of the selected task.

The task processing apparatus may further include a combiner to combine the first task and the second task into a single task.

The allocator may allocate the combined single task to the existing allocation server.

The controller may decrease a parallelization level of the combined task compared to a parallelization level of the first task and the second task.

The executor may parallel-process the first task and the second task through the existing allocation server and the idle server, respectively.

The task selection information may include rule information used to select a task having a relatively large number of child nodes from the at least one task.

The task selection information may include rule information used to select a task having a relatively small prediction interval up to a child node from the at least one task.

The task selection information may include rule information used to minimize the average execution time of entire nodes.

The task selection information may include rule information used to minimize an execution time of a node having the longest execution time.

According to another aspect of the present invention, there is provided a task processing method, including: allocating at least one task to at least one server; executing each task through each server; selecting a task corresponding to predetermined task selection information when a task execution is completed and an idle server occurs in the at least one server; separating the selected task into a first task and a second task; and controlling the first task and the second task to be allocated to an existing allocation server of the selected task and the idle server, respectively.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

According to an embodiment of the present invention, when a precedence graph of tasks is prescribed, a task processing apparatus may allocate and process the tasks by applying load balancing.

The precedence graph may prescribe an execution order between tasks. The task processing apparatus may analyze the precedence graph and then, may insert a task into a waiting queue based on a priority order and execute the task through a server of a cluster.

Figure 1:
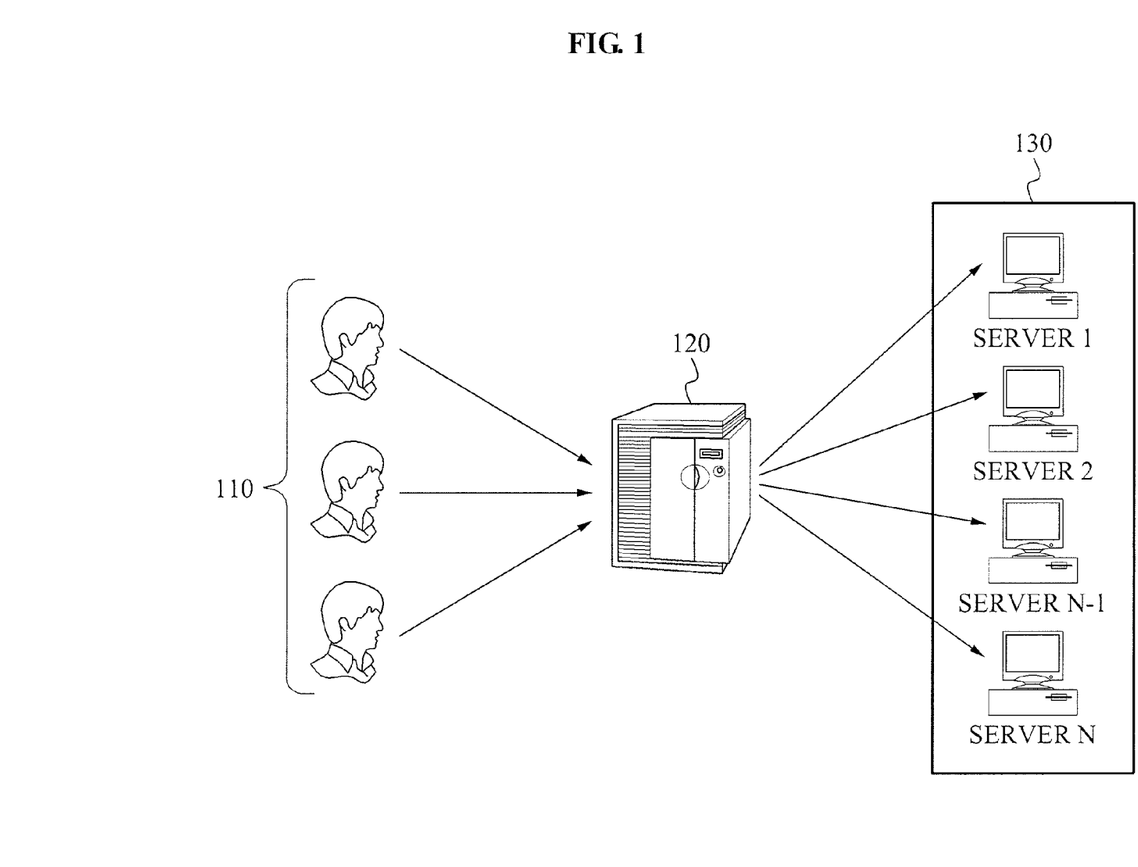
FIG. 1 is a diagram illustrating a configuration of a system capable of applying a task processing apparatus according to an embodiment of the present invention.

FIG. 1 is a diagram illustrating a configuration of a system capable of applying a task processing apparatus according to an embodiment of the present invention.

Referring to FIG. 1, the task processing apparatus may perform a load balancing scheme based on a precedence graph. A plurality of users 110 may allocate a large amount of data to a plurality of servers 130 through a distributor 120, and may control the allocated data to be parallel-processed by the plurality of servers 130.

Figure 2:
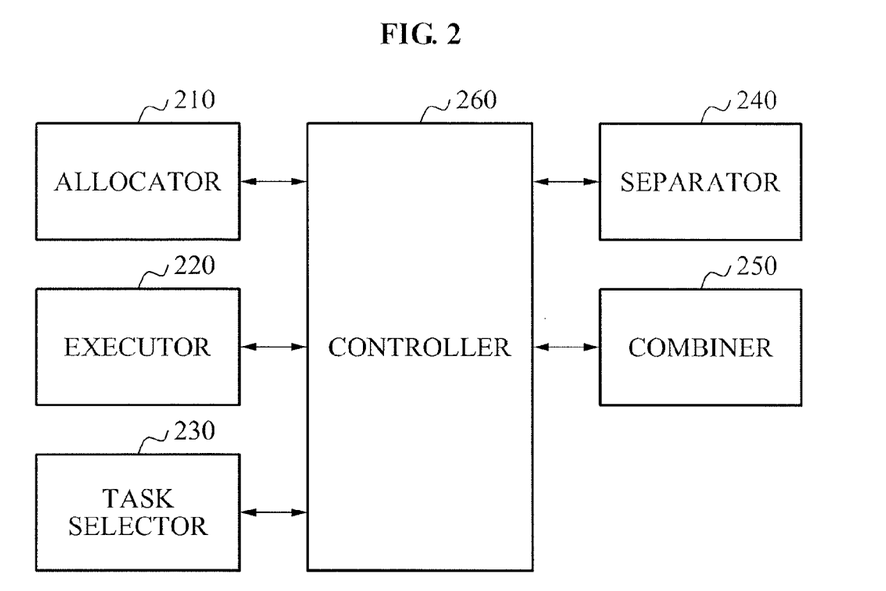
FIG. 2 is a block diagram illustrating a configuration of a task processing apparatus according to an embodiment of the present invention.

FIG. 2 is a block diagram illustrating a configuration of a task processing apparatus according to an embodiment of the present invention.

Referring to FIG. 2, the task processing apparatus may include an allocator 210, an executor 220, a task selector 230, a separator 240, a combiner 250, and a controller 260.

The allocator 210 may allocate at least one task to at least one server. The executor 220 may execute each task through each server. The task selector 230 may select a task corresponding to predetermined task selection information when a task execution is completed and an idle server occurs in the at least one server. The separator 240 may separate the selected task into a first task and a second task.

The controller 260 may control the first task and the second task to be allocated to an existing allocation server of the selected task and the idle server, respectively. Here, the controller 260 may increase a parallelization level of the first task and the second task compared to a parallelization level of the selected task.

The combiner 250 may combine the first task and the second task into a single task, and the allocator 210 may allocate the combined single task to the existing allocation server. Here, the controller 260 may decrease a parallelization level of the combined task compared to the parallelization level of the first task and the second task.

The executor 220 may parallel-process the first task and the second task through the existing allocation server and the idle server, respectively.

Hereinafter, an example of processing large capacity of a task by applying a load balancing scheme based on a precedence graph will be described, but the present invention is not limited thereto.

Figure 3:
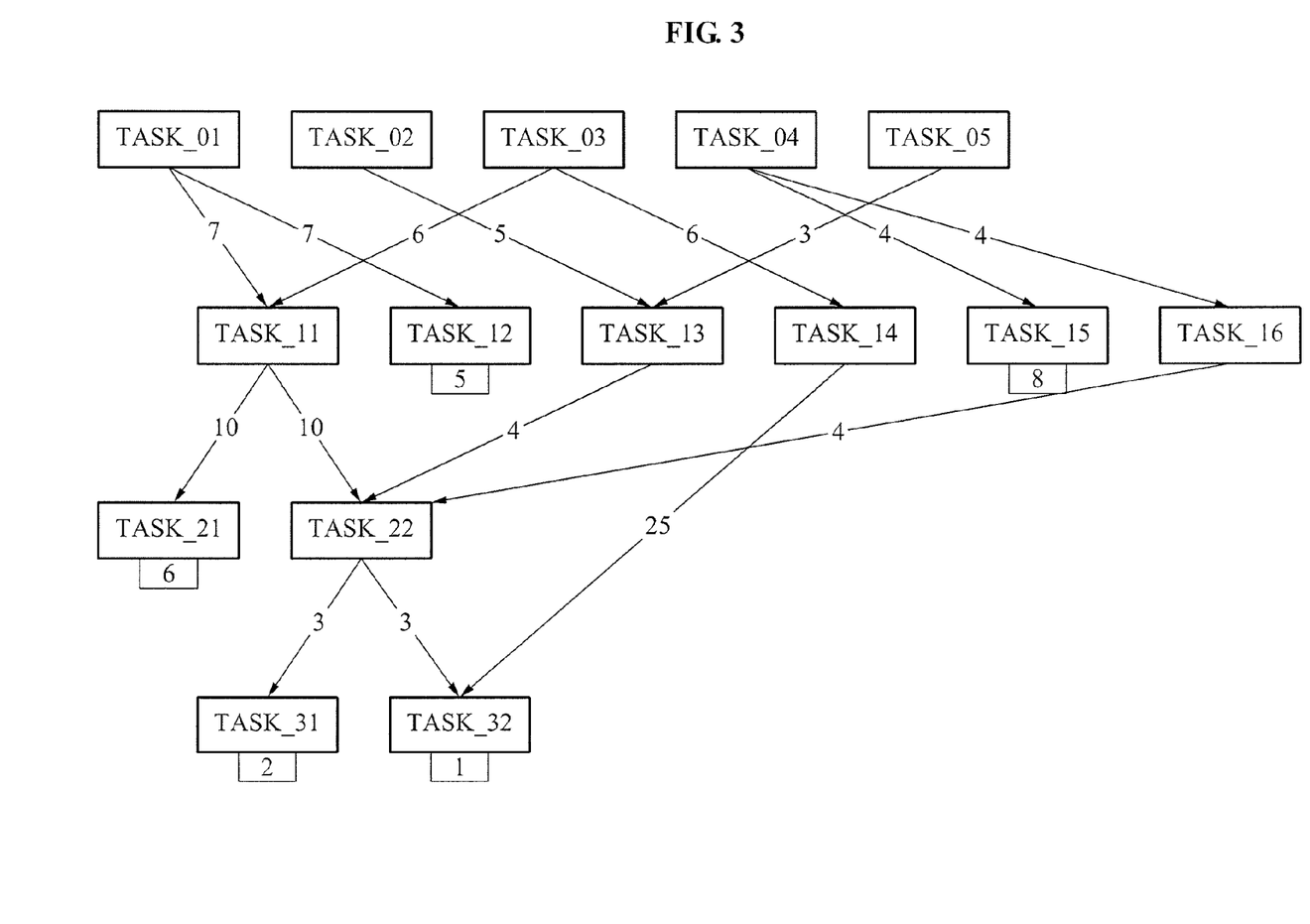
FIG. 3 is an example of a precedence graph included in a distributor of FIG. 1.

FIG. 3 is an example of a precedence graph included in the distributor 120 of FIG. 1.

Referring to FIG. 3, TASK_01, TASK_02, TASK_03, TASK_04, and TASK_05 may correspond to tasks that do not have an ancestor node on the precedence graph, and may be immediately executed when an execution request is received and an idle server is present.

Here, TASK_32 may be executed only when execution of TASK_22 and TASK_14 is completed. For example, TASK_32 may be executed in a state in which execution of all of TASK_22, TASK_11, TASK_13, TASK_14, TASK_01, TASK_03, TASK_02, and TASK_05 is completed.

It is assumed here that TASK_12, TASK_15, TASK_21, TASK_31, and TASK_32 correspond to leaf nodes that do not affect other tasks, and execution times thereof are 5 minutes, 8 minutes, 6 minutes, 2 minutes, and 1 minutes, respectively.

Also, it is assumed that an execution time of a remaining task corresponds to a number indicated by an arrow indicator. For example, an execution time of TASK_11 is ten minutes.

When it is assumed that TASK_01, TASK_02, TASK_03, TASK_04, and TASK_05 are allocated to a cluster and are simultaneously executed, the cluster may include a total of five servers. The respective servers may be allocated with a single task and thus, may simultaneously process five tasks. Here, TASK_01, TASK_02, TASK_03, TASK_04, and TASK_05 may be allocated to SERVER 1, SERVER 2, SERVER 3, SERVER 4, and SERVER 5, respectively.

At point in time when three minutes is elapsed since start, execution of TASK_05 is completed, and TASK_01, TASK_02, TASK_03, and TASK_04 are still in execution. Therefore, at the above point in time, a single cluster server, for example, server 5 may enter into an idle state. The task processing apparatus may decrease a data processing time by quickly allocating a task to the idle server.

For example, to use the idle server, the task processing apparatus may parallelize a portion of TASK_01, TASK_02, TASK_03, and TASK_04.

The task processing apparatus may perform programming of each task to be operated in a single server or multiple servers, and may select a task to be parallelized by applying various rules included in task selection information based on a purpose.

Figure 4:
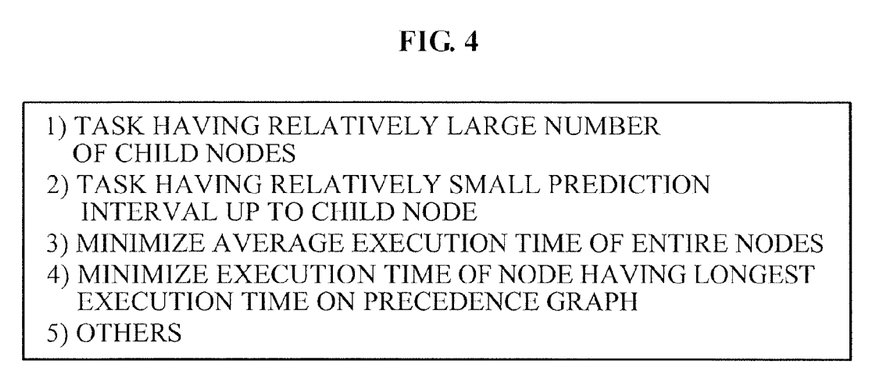
FIG. 4 is a diagram illustrating an example of task selection information according to an embodiment of the present invention.

FIG. 4 is a diagram illustrating an example of task selection information according to an embodiment of the present invention;

Referring to FIG. 4, the task selection information may include at least one of rule information used to select a task having a relatively large number of child nodes from at least one task, rule information used to select a task having a relatively small prediction interval up to a child node from the at least one task, rule information used to minimize the average execution time of entire nodes, and rule information used to minimize an execution time of a node having the longest execution time. The task processing apparatus may select a task without applying the above rules.

Hereinafter, a method of selecting a task by applying rules 1) and 2) of FIG. 4 will be described.

Referring to FIGS. 3 and 4, TASK_01 and TASK_03 may have the maximum child nodes (=2). An execution time of TASK_03 is "6" minutes and thus, is smaller than an execution time, "7" minutes, of TASK_01. For example, the task processing apparatus may select TASK_03 for task parallel-processing.

Figure 5:
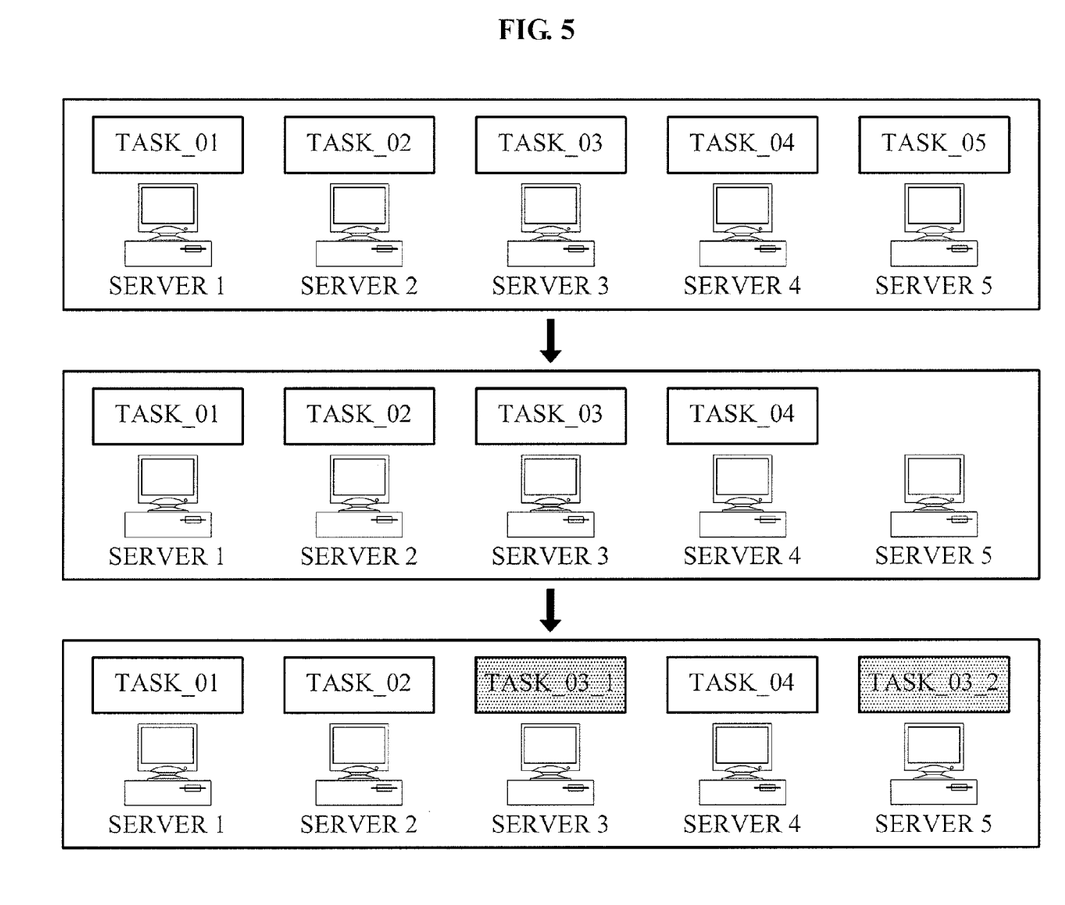
FIG. 5 is a diagram illustrating an example of task parallel-processing according to an embodiment of the present invention.

FIG. 5 is a diagram illustrating an example of parallel-processing tasks according to an embodiment of the present invention.

Referring to FIG. 5, when a task execution is completed and thus, an idle server occurs in at least one server, a task processing apparatus may select a task corresponding to predetermined task selection information and may separate the selected task into a first task and a second task.

The task processing apparatus may control the first task and the second task to be allocated to an existing allocation server of the selected task and the idle server, respectively, and may increase a parallelization level of the first task and the second task compared to a parallelization level of the selected task.

For example, to use an idle server, the task processing apparatus may perform parallel processing by separating TASK_03 into TASK_03_1 and TASK_03_2, and by allocating TASK_03_1 and TASK_03_2 to SERVER 3 and SERVER 5, respectively. Here, TASK_03 is parallelized to two tasks and thus, a parallelization level of the above process may be increased to "2".

Here, a predicted execution time of TASK_03 is six minutes, but TASK_03 is parallelized to two tasks, for example, TASK_03_1 and TASK_03_2 from a point in time when three minutes is elapsed. Accordingly, when it is assumed that overhead according to parallelization is absent, execution of TASK_03 may be terminated at four minutes and 30 seconds.

Also, at a point in time when four minutes is elapsed, execution of TASK_04 is completed and TASK_15 and TASK_16 may enter into an executable state. Accordingly, four idle severs may occur. Here, depending on applications, the task processing apparatus may immediately execute TASK_15 and TASK_16, and may execute one task, for example, TASK_15 and execute a remaining task, for example, TASK_16 at four minutes 30 minutes when execution of TASK_03_1 and TASK_03_2 is terminated.

According to an embodiment of the present invention, the task processing apparatus may combine the first task and the second task into a single task and may allocate the combined single task to the existing allocation server. Here, the task processing apparatus may decrease a parallelization level of the combined task compared to a parallelization level of the first task and the second task.

Figure 6:
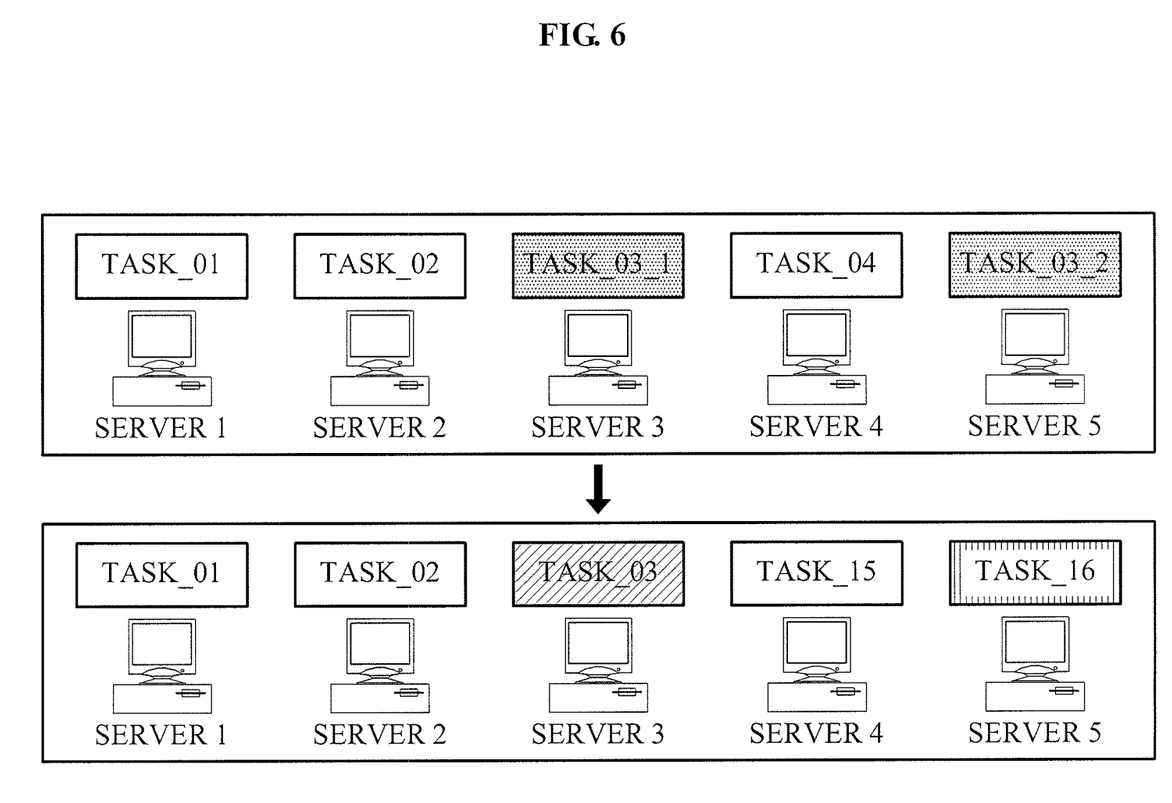
FIG. 6 is a diagram illustrating an example of decreasing a parallelization level of a task according to an embodiment of the present invention.

FIG. 6 is a diagram illustrating an example of decreasing a parallelization level of a task according to an embodiment of the present invention.

Referring to FIG. 6, the task processing apparatus may need to allocate two idle servers to drive TASK_15 and TASK_16, but currently only single idle server, for example, SERVER 4 is present. Here, since TASK_03_1 and TASK_03_2 are parallelized for using the idle server, for example, SERVER 5, TASK_03_1 and TASK_increas03_2 may be combined into TASK_03 again as necessary. Here, a parallelization level of TASK_03 may be decreased from "2" to "1". TASK_15 and TASK_16 may be executed through SERVER 4 and SERVER 5, respectively.

The task processing apparatus may enhance a data processing rate by maximizing utilization of an idle server and by maintaining a parallelization level to be suitable for each task.

Hereinafter, a task processing method according to an embodiment of the present invention will be described.

Figure 7:
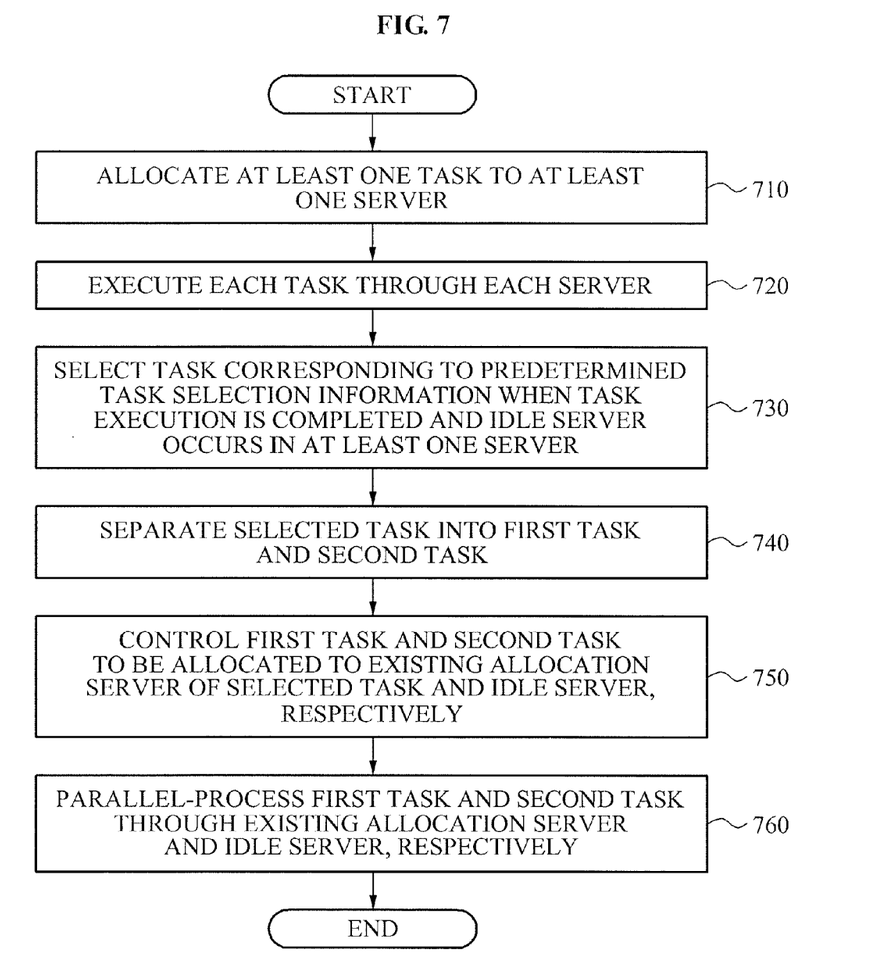
FIG. 7 is a flowchart illustrating a task processing method according to an embodiment of the present invention.

FIG. 7 is a flowchart illustrating a task processing method according to an embodiment of the present invention.

Referring to FIG. 7, a task processing apparatus may allocate at least one task to at least one server in operation 710, and may execute each task through each server in operation 720.

The task processing apparatus may select a task corresponding to predetermined task selection information when a task execution is completed and an idle server occurs in the at least one server, in operation 730, and may separate the selected task into a first task and a second task in operation 740.

In operation 750, the task processing apparatus may control the first task and the second task to be allocated to an existing allocation server of the selected task and the idle server, respectively. In operation 760, the task processing apparatus may parallel-process the first task and the second task through the existing allocation server and the idle server, respectively.

Figure 8:
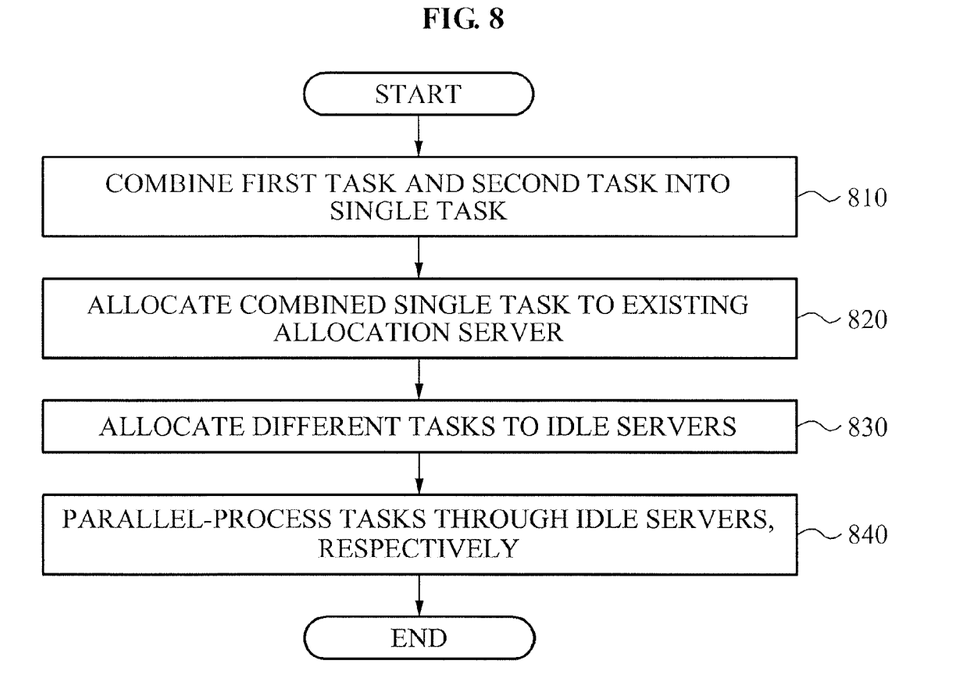
FIG. 8 is a flowchart illustrating a method of decreasing a parallelization level of a task according to an embodiment.

FIG. 8 is a flowchart illustrating a method of decreasing a parallelization level of a task according to an embodiment.

Referring to FIG. 8, a task processing apparatus may combine the first task and the second task into a single task in operation 810, and may allocate the combined single task to the existing allocation server in operation 820.

The task processing apparatus may allocate different tasks to idle servers in operation 830, and may parallel-process the tasks through the idle servers, respectively, in operation 840.

According to an embodiment of the present invention, it is possible to more efficiently allocate a task to a data processing cluster node based on precedence graph information.

According to an embodiment of the present invention, it is possible to enhance a data processing rate by minimizing idle resources.

According to an embodiment of the present invention, it is possible to decrease hardware purchase costs by reducing the number of servers required for processing data.

According to an embodiment of the present invention, it is possible to efficiently parallel-process large weather data received from a stationary orbit weather satellite.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. a task processing apparatus, comprising:
an allocator to allocate a plurality of tasks to a plurality of servers, each task being allocated to a different server;

an executor to execute the plurality of tasks through the plurality of servers;

a task selector to select a task, which is allocated to an existing allocation server from among the plurality of servers, to be parallel processed by multiple servers from among the plurality of servers, the task being selected from among the plurality of tasks based on predetermined task selection information when a task execution is completed and an idle server occurs in the plurality of servers, wherein the predetermined task selection information to be parallelized comprises rule information used to select a task having a relatively large number of child nodes from the plurality of tasks and a relatively small prediction interval up to a child node from the plurality of tasks;

a separator to separate the selected task into a first task and a second task applying a parallelization level of the first task and second task;

a controller to control the first task to be allocated to the existing allocation server and the second task to be allocated to the idle server in order to parallel process the first and second tasks; and a combiner to combine the first task and the second task into a single task, wherein the allocator allocates the combined single task to the existing allocation server.

2. The task processing apparatus of claim 1, wherein the controller decreases a parallelization level of the combined task compared to a parallelization level of the first task and the second task.

3. The task processing apparatus of claim 1, wherein the executor parallel-processes the first task and the second task through the existing allocation server and the idle server, respectively.

4. The task processing apparatus of claim 1, wherein the task selection information comprises rule information used to minimize the average execution time of entire nodes.

5. The task processing apparatus of claim 1, wherein the task selection information comprises rule information used to minimize an execution time of a node having the longest execution time.

6. a task processing method, comprising:

allocating a plurality of tasks to a plurality of servers, each task being allocated to a different server;

executing the plurality of tasks through the plurality of servers;

selecting a task, which is allocated to an existing allocation server from among the plurality of servers, to be parallel processed by multiple servers from among the plurality of servers, the task being selected from among the plurality of tasks based on predetermined task selection information when a task execution is completed and an idle server occurs in the plurality of servers, wherein the predetermined task selection information to be parallelized comprises rule information used to select a task having a relatively large number of child nodes from the plurality of tasks and a relatively small prediction interval up to a child node from the plurality of tasks;

separating the selected task into a first task and a second task applying a parallelization level of the first task and second task;

controlling the first task to be allocated to the existing allocation server and the second task to be allocated to the idle server in order to parallel process the first and second tasks; and combining the first task and the second task into a single task, wherein the allocator allocates the combined single task to the existing allocation server.

7. The method of claim 6, further comprising:

decreasing a parallelization level of the combined task compared to a parallelization level of the first task and the second task.

8. The method of claim 6, further comprising:

parallel-processing the first task and the second task through the existing allocation server and the idle server, respectively.

9. The method of claim 6, wherein the task selection information comprises rule information used to minimize the average execution time of entire nodes.

10. The method of claim 6, wherein the task selection information comprises rule information used to minimize an execution time of a node having the longest execution time.

* * * * *